Patented Mar. 21, 1933

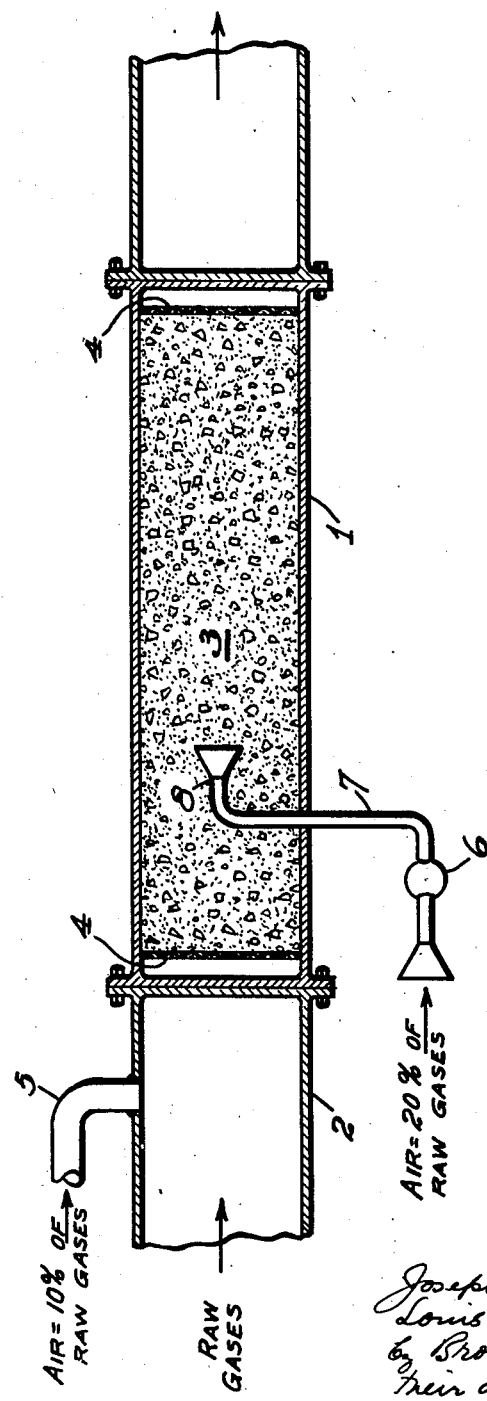

1,902,160

UNITED STATES PATENT OFFICE

JOSEPH C. W. FRAZER, OF BALTIMORE, MARYLAND, AND LOUIS S. KASSEL, OF PITTSBURGH, PENNSYLVANIA; SAID KASSEL ASSIGNOR TO CARBON MONOXIDE ELIMINATOR CORPORATION, OF PITTSBURGH, PENNSYLVANIA, A CORPORATION OF DELAWARE

METHOD OF USING OXIDATION CATALYSTS

Application filed June 29, 1931. Serial No. 547,674.

This invention relates to catalytic oxidation processes, and particularly to such processes applied to eliminate combustible constitutents from exhaust gases of internal combustion engines.

Catalysts used for the oxidation of gases at elevated temperatures generally require heating to bring them up to starting temperature before they function satisfactorily. This is disadvantageous, particularly where the catalysts are used intermittently, for example in the treatment of internal combustion engine exhaust gases, that is, in general, the starting temperatures of the catalysts which can be used to efficiently and continuously eliminate combustible constituents from such gases whenever the engine is operated are so high as to render it difficult to heat the catalysts practically by the exhaust gases from modern internal combustion engines. Practically, such catalysts have had to be heated by accessory means, such as by spark ignition of enriched gases in the catalyst zone, electrical heating elements, and the like. Such use of accessories introduces complications in construction, and in operation of the catalytic devices, increases their expense, and is otherwise disadvantageous.

The objects of this invention are to provide a method of conducting catalytic oxidation reactions, and particularly the catalytic combustion of combustible constituents of internal combustion engine exhaust gases, which lowers the normal starting temperature of the catalyst, in which the lowering of the starting temperature permits the catalyst to function whenever gases are supplied to it, and which dispenses with the need for auxiliary heating of the catalyst.

The invetnion may be described in connection with the accompanying drawing which represents one form of apparatus that may be used in the treatment of internal combustion engine exhaust gases in accordance with the invention.

The requirements of a catalyst used in e'iminating the combustible constitutents from internal combustion exhaust gases during intermittent operation of the engine are particularly severe, due to special conditions imposed by such use. Thus, through the combustion of the large amounts of carbon monoxide, unburned fuel and oil and decomposition products thereof, carried by such gases the catalyst must operate at relatively high temperatures. Also, to be satisfactory for such use it must be capable of operating at substantially perfect efficiency whenever the engine is operated, i. e. after repeated heating and cooling of the catalyst. Moreover, the gases carry relatively large amounts of water vapor. In addition to meeting these requirements, it is desirable also that such catalysts be capable of being brought up to starting temperature by the heat of the exhaust gases, and of functioning rapidly whenever gases are supplied to them.

It has been found that artificially prepared copper chromites are capable of efficiently oxidizing the combustible constituents of exhaust gases supplied during intermittent operation of internal combustion engines. The present invention is predicated upon our discovery that when such artificially prepared copper chromites are subjected in a heated condition to a gaseous reducing atmosphere their normal starting temperature is reduced. As a result of such lowering of the starting temperature the catalyst may be caused to function more rapidly than when not so treated, and thus they may be used for this purpose without requiring external or other accessory heating means. The subsequent exposure of the catalyst to oxygen sufficient to cause complete oxidation of the combustible constituents of the gases generally destroys the effect of the reducing treatment, but the copper chromites may be maintained continuously in their low starting temperature condition, ready for use whenever gases are supplied to it, in a manner presently to be described.

The invention is applicable generally to catalytic oxidation processes, but because it is especially adapted to the treatment of internal combustion exhaust gases, as referred to hereinabove, it will be particularly described with reference thereto by way of illustration.

Various reducing atmospheres may be used for conditioning the catalyst for low temperature starting. We have found, however, that the exhaust gases themselves provide suitable reducing conditions, and for this reason they are preferably used. In such treatment of exhaust gases the practice is to admix them with oxygen in an amount at least sufficient to effect complete oxidation of the combustible content of the gases, for instance by introducing air in a volume regulated by the volume of gases to be treated.

The mixture of gases and oxygen referred to is, of course, not a reducing atmosphere. For this reason the reducing treatment may be effected by passing the gases to the catalyst as they emanate from the engine, i. e., without substantial cooling and without being admixed with air. The gases heat the catalyst and exert some action, not fully understood at present, by which its starting temperature is lowered. For example, the starting temperature of one of the copper chromite catalysts embodied in our invention normally, i. e., when not treated with a reducing atmosphere, is about 280° C. But when treated with reducing gas, in accordance with the invention, it begins to function at about 225° C. In this manner its starting temperature has been decreased about 55° C. Similarly, the starting temperature of another of these chromites may be lowered to about 150° C. from its normal starting temperature of about 250° C.

We now believe that an actual reduction of the catalysts occurs when they are treated with the reducing gases, because subsequent exposure of the catalyst to a mixture of the gases and sufficient oxygen for complete combustion appears to destroy their ability to start at the lower temperature.

Whether or not actual reduction is effected, the treatment does condition the catalysts to begin functioning below their normal starting temperatures.

Although use of the catalysts in their low temperature starting condition restores them to their initial condition, they may be repeatedly or continuously subjected to the reducing temperature for the same purpose. Thus by preliminarily treating the catalyst with the reducing atmosphere each time it is used the catalyst starts continuously at the lower temperature.

As thus heated and reduced the catalyst is capable of exerting its oxidizing activity upon the introduction of oxygen, or air. In order to avoid undue cooling, small amounts of air are supplied at first, and as the catalyst becomes heated further by the heat of oxidation the air supply is increased to that needed. The heat of reaction then keeps the catalyst at operating temperature.

If desired, the raw substantially uncooled gases may be mixed with air in an amount less than that necessary for complete combustion, with equally satisfactory results. This procedure is preferable, because the gases exert their reducing effect, and as soon as a part of the catalyst is converted to its low temperature condition it begins to function, using the small amount of oxygen in the mixture. This heats it further, and the air necessary for complete combustion may then be introduced continuously. In both cases the gases passed to the catalyst contain insufficient oxygen for complete combustion, so that expression applies to both.

Whether treated with raw gases or with hot gases containing less than enough oxygen for complete combustion, the lowered starting temperature engendered by such treatment causes the catalyst to begin functioning more rapidly than when in its normal, or unreduced, condition. Thereby elimination of the toxic and other objectionable constituents of the gases is effected as soon as possible after the engine is started, which is, of course, desirable. And by virtue of this lowering of the starting temperature it is possible to dispense with external or auxiliary heating of the catalyst, the depression in starting temperature rendering the catalyst capable of functioning by the heat of the gases supplied to it. This eliminates the expense and disadvantages of accessory equipment.

In the preferred embodiment of the invention the catalyst is maintained continuously and automatically ready for low temperature starting by subjecting a portion thereof to reducing conditions during the time gases are supplied to it. For example, as long as the engine is operated a portion of the catalyst is subjected to gases containing insufficient oxygen for complete combustion. In this embodiment the continuously reduced portion is disposed in heat exchanging relationship with another portion of catalyst which receives the gases together with enough air for complete combustion. When the engine is started the reduced portion is in condition to be heated and to become effective at once, in the manner described hereinabove, and the second portion, which starts at the higher temperature, is thus heated and functions to eliminate combustibles from the gases. Thereby the catalyst is always ready for use when the engine is started.

Preferably, this is accomplished by the use of a substantially continuous catalyst bed having a reduced and an unreduced zone disposed consecutively in the path of the gases. The reduced zone thus forms the inlet, and is continuously subjected to reducing conditions, and therefore is always in its reduced, low temperature starting state. Most suitably the catalyst in the inlet zone receives the substantially uncooled gases together with a small amount of oxygen; the balance of the oxygen needed for the oxidation being introduced as they pass to the second, or unreduced, zone. In this manner the catalyst in the inlet zone is continuously maintained in its reduced condition, always ready to function when the engine is again started.

The invention may be understood further by reference to the accompanying drawing illustrative of its preferred embodiment. A catalyst chamber of any suitable form, such as a tube 1, is inserted in the exhaust line 2 of an internal combustion engine, and is provided with granules 3 of artificially prepared copper chromite catalyst through which the gases flow. The catalyst is held in position by end screens 4. As shown by the arrows, exhaust gases from the engine, substantially uncooled, pass directly into the catalyst chamber after being mixed with a minor proportion of oxygen, for instance air equivalent to about 10 percent of the volume of gases flowing from the engine. Such air may be introduced to the exhaust manifold immediately ahead of the catalyst chamber by means of a conduit 5, the air at this point being regulated in any suitable manner, as by means of an aspirator, or blower, not shown.

Rearwardly of the inlet to the catalyst chamber means are provided for introducing additional oxygen, or air, for complete combustion of the combustible constituents of the gases. As shown schematically in the drawing, a pump 6 draws air from the atmosphere and passes it through a conduit 7 to a distributing funnel 8 embedded in the catalyst mass.

In such operation all of the hot exhaust gases together with a minor amount of air pass continuously through the inlet portion of the catalyst, and it is thus kept at its lowered starting temperature, and complete combustion is effected in the balance of the catalyst bed. When the engine is started after a period of idleness the heat of the gases and the small amount of oxygen causes oxidation of the carbon monoxide and other combustible constituents to begin in the inlet zone. The flow of gases through the catalyst, and thermal conduction through the catalyst bed, promptly brings the catalyst beyond the reduced zone to its operating temperature, and in the presence of the needed oxygen complete combustion of the gases is effected. Assuming that air in a volume equal to 30 percent of the gases is needed, a volume equal to 20 percent will be introduced here under the conditions stated. Thus the catalyst is always ready to function whenever the engine is operated.

Various copper chromites may be used in the practice of the invention. For example suitable catalysts may be made by a method that comprises treating copper hydroxide with chromic acid solution to form a chromate, and heating the chromate to convert it to copper chromite. In one embodiment of this procedure a suitable chromite may be made from copper acid chromate. For example, 296 grams of hydrated copper nitrate [$Cu(NO_3)_2.6H_2O$] dissolved in a large excess of water is precipitated with half-strength ammonia, and to the resultant suspension of cupric hydroxide there is added a concentrated solution of 200 grams of chromic oxide. These proportions correspond to the acid chromate, $Cu(HCrO_4)_2$. Upon evaporating the solution to dryness and heating the residue, there is formed a copper chromite catalyst which presumably has the composition $Cu(CrO_2)_2$, or $CuO.Cr_2O_3$, i. e., the meta chromite.

Other copper chromites may be used also. For example, if more cupric hydroxide is added to the chromate solution just described, a precipitate is formed which, judged from the proportions of the reagents used, corresponds to neutral cupric chromate, $CuCrO_4$. This is converted by heat to an active catalyst. As in the case of the foregoing catalyst, its exact formula is not known, but it is probably a basic chromite corresponding to the empirical formula $(CuO)_2.Cr_2O_3$, although it may comprise a mixture of copper chromite and meta chromite,

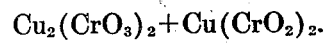

$$Cu_2(CrO_3)_2 + Cu(CrO_2)_2.$$

In making catalysts by this procedure the copper hydroxide is preferably used in a freshly precipitated condition, because as so prepared it reacts quickly with the chromic acid. After the chromates have been converted to chromites by heating the residues are broken into granules for use.

In tests of these catalysts the exhaust gases from a standard internal combustion engine were passed through the catalyst with air sufficient for complete combustion. Untreated with reducing gases the starting temperature of the meta chromite approximated 280° C., and that of the basic chromite 250° C. Upon being treated in accordance with the invention, by passing the exhaust gases over a portion of the catalyst, at the rate of about 25 cubic feet per hour, the starting temperature of the meta chromite was lowered to approximately 225° C. The effect was even more pronounced with the basic chromite, which was thus conditioned to start at about 150° C. In both cases the starting temperature remained substantially constant after long continued use, both continuous and intermittent. The catalysts remained capable of continuously eliminating the carbon monoxide and other combustible constituents from the gases, their activity being unaffected by the repeated subjection to elevated temperatures, and by the reducing treatments, whether of the repeated or continuous type referred to herein, and they continued to start at the reduced temperatures referred to.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. In a process of oxidizing an oxidizable gas in which an atmosphere containing said gas and oxygen sufficient for its complete oxidation is passed into contact with an artificially prepared copper chromite catalyst at an elevated temperature, the step comprising treating said chromite at an elevated temperature with a gaseous reducing agent prior to contact with said atmosphere of gas and oxygen to decrease the temperature at which said chromite begins to function when said atmosphere is supplied to it.

2. In a process of oxidizing an oxidizable gas in which an atmosphere containing said gas and oxygen sufficient for its complete oxidation is passed into contact with an artificially prepared copper chromite catalyst at an elevated temperature, the step comprising treating said chromite at an elevated temperature with heated products of combustion from an internal combustion engine containing oxygen insufficient for complete combustion of the combustible constituents thereof and forming an atmosphere of reducing character, prior to contact with said atmosphere of gas and oxygen to decrease the temperature at which said chromite begins to function when said atmosphere is supplied to it.

3. In a method of oxidizing an oxidizable gas, the steps comprising passing heated gas together with insufficient oxygen for complete oxidation into contact with catalytically active artificially prepared copper chromite, whereby to initiate reaction directly, and then supplying the gas in contact with the catalyst with sufficient oxygen for complete oxidation.

4. In a method of oxidizing an oxidizable gas, the steps comprising passing heated gas together with insufficient oxygen for complete oxidation into contact with catalytically active artificially prepared copper chromite, corresponding substantially to the empirical formula $(CuO)_2 \cdot Cr_2O_3$, whereby to initiate reaction directly, and then supplying the gas in contact with the catalyst with sufficient oxygen for complete oxidation.

5. In a method of oxidizing an oxidizable gas, the steps comprising passing heated gas together with insufficient oxygen for complete oxidation into contact with catalytically active artificially prepared copper chromite, corresponding substantially to the empirical formula $Cu(CrO_2)_2$, whereby to initiate reaction directly, and then supplying the gas in contact with the catalyst with sufficient oxygen for complete oxidation.

6. In a method of oxidizing an oxidizable gas at an elevated temperature and in the presence of oxygen by means of an oxidation catalyst comprising artificially prepared catalytically active copper chromite, the steps comprising treating the catalyst with heated gas while introducing oxygen in an amount insufficient to effect complete oxidation, whereby to initiate reaction without externally heating the catalyst, and then supplying sufficient oxygen with the gas to effect complete oxidation.

7. A method of catalytically oxidizing an oxidizable constituent of a gas by means of artificially prepared catalytically active copper chromite whenever gas is supplied to the catalyst, comprising passing heated gas through a body of said catalyst, introducing with the incoming gas oxygen in an amount insufficient to effect complete oxidation, and introducing to a subsequent portion of the catalyst sufficient oxygen to complete said oxidation, whereby to continuously maintain the catalyst capable of starting at a temperature below that at which it normally begins to function, and to effect said oxidation when gases are supplied to it.

8. A process according to claim 7, said catalyst corresponding to the empirical formula $(CuO)_2 \cdot Cr_2O_3$.

9. A method of catalytically oxidizing an oxidizable constituent of a gas by means of artificially prepared catalytically active copper chromite whenever gas is supplied to the catalyst, comprising passing the gas in a continuous stream through successive portions of the catalyst in heat exchanging relationship with each other, continuously introducing with the raw gases incoming to the first portion oxygen in an amount insufficient to effect complete oxidation, and continuously introducing with the gases passing to said succeeding portion oxygen sufficient to effect complete oxidation, whereby to continuously maintain the catalyst capable of starting at a temperature below that at which it normally begins to function, and to effect said oxidation when gases are supplied to it.

10. A method of eliminating combustible constituents from internal combustion engine exhaust gases during intermittent operation thereof, comprising subjecting said gases in a substantially uncooled stream to a body of artificially prepared catalytically active copper chromite, mixing the gases passing to the inlet portion of the catalyst with an amount of oxygen insufficient to effect complete combustion, and introducing sufficient oxygen to complete said combustion to an adjacent subsequent portion of the catalyst arranged in heat exchanging relationship with said inlet portion, whereby to continuously effect said combustion without external heating of the catalyst whenever the gases are supplied to it.

11. In a method of eliminating combustible constituents from internal combustion engine exhaust gases by subjecting said gases in the presence of oxygen to an artificially prepared catalytically active copper chromite at an elevated temperature, the steps comprising passing the substantially uncooled gases to a continuous body of said catalyst, continuously introducing with the incoming gases oxygen in an amount insufficient for complete oxidation of said constituents, and continuously introducing to a subsequent portion of said body the balance of the oxygen needed for complete oxidation, whereby the catalyst is maintained capable of initiating oxidation when such products and oxygen are again supplied to it.

12. In a method of eliminating combustible constituents from internal combustion engine exhaust gases by subjecting said gases in the presence of oxygen to an artificially prepared catalytically active copper chromite, corresponding substantially to the empirical formula $(CuO)_2.Cr_2O_3$, at an elevated temperature, the steps comprising passing the substantially uncooled gases to a continuous body of said catalyst, continuously introducing with the incoming gases oxygen in an amount insufficient for complete oxidation of said constituents, and continuously introducing to a subsequent portion of said body the balance of the oxygen needed for complete oxidation, whereby the catalyst is maintained capable of initiating oxidation when such products and oxygen are again supplied to it.

13. In a process of oxidizing an oxidizable gas in which an atmosphere containing said gas and oxygen sufficient for its complete oxidation is passed into contact with artificially prepared copper chromite catalyst at an elevated temperature, the step comprising treating said chromite at an elevated temperature with a mixture of said gas and insufficient oxygen for complete oxidation thereof and forming an atmosphere of reducing character prior to contact with said atmosphere containing sufficient oxygen for complete oxidation to reduce the temperature at which said chromite begins to function when contacted with said atmosphere.

In testimony whereof, I sign my name.
JOSEPH C. W. FRAZER.
In testimony whereof, I sign my name.
LOUIS S. KASSEL.